(12) United States Patent
Kangralkar et al.

(10) Patent No.: US 10,748,395 B2
(45) Date of Patent: Aug. 18, 2020

(54) SYSTEM AND METHOD FOR TRACKING OF DEPLOYED UNITS

(71) Applicants: Vivek Kangralkar, Plano, TX (US); Vikram Patil, Bangalore (IN)

(72) Inventors: Vivek Kangralkar, Plano, TX (US); Vikram Patil, Bangalore (IN)

(73) Assignees: Vivek Kangralkar, Plano, TX (US); Vikram Patil, Bangalore (IN)

( * ) Notice: Subject to any disclaimer, the term of this patent is extended or adjusted under 35 U.S.C. 154(b) by 0 days.

(21) Appl. No.: 16/512,933

(22) Filed: Jul. 16, 2019

(65) Prior Publication Data
US 2019/0340901 A1    Nov. 7, 2019

Related U.S. Application Data

(63) Continuation of application No. 16/110,762, filed on Aug. 23, 2018, now Pat. No. 10,403,104.
(60) Provisional application No. 62/547,096, filed on Aug. 17, 2017.

(51) Int. Cl.
| | | |
|---|---|---|
| *G08B 13/14* | (2006.01) | |
| *G08B 21/18* | (2006.01) | |
| *H04W 4/029* | (2018.01) | |
| *G08B 29/18* | (2006.01) | |
| *H04W 4/38* | (2018.01) | |

(52) U.S. Cl.
CPC ......... *G08B 13/14* (2013.01); *G08B 13/1436* (2013.01); *G08B 21/182* (2013.01); *G08B 29/188* (2013.01); *H04W 4/029* (2018.02); *H04W 4/38* (2018.02)

(58) Field of Classification Search
None
See application file for complete search history.

(56) References Cited

U.S. PATENT DOCUMENTS

| | | | | |
|---|---|---|---|---|
| 6,067,044 A | * | 5/2000 | Whelan | G01S 5/0027 |
| | | | | 342/357.4 |
| 6,669,089 B2 | | 12/2003 | Cybulski et al. | |
| 7,171,187 B2 | * | 1/2007 | Haave | B60R 25/102 |
| | | | | 340/686.1 |
| 7,265,668 B1 | * | 9/2007 | Brosius | G06Q 10/08 |
| | | | | 340/539.22 |
| 7,336,182 B1 | * | 2/2008 | Baranowski | G08B 13/1436 |
| | | | | 340/522 |

(Continued)

*Primary Examiner* — Fekadeselassie Girma
(74) *Attorney, Agent, or Firm* — M&B IP Analysts, LLC

(57) ABSTRACT

A tracker apparatus, and method for tracking deployable units. The tracker apparatus includes a first sensor group having a first power consumption profile; a second sensor group having a second power consumption profile; a communication circuit having a first network interface for communicating with a control server; an energy storage; a processing circuitry; and a memory, wherein the memory includes instructions that, when executed by the processing circuitry, configure the tracker apparatus to: trigger the processing circuitry to awaken from a low power mode in response to a first input from a first sensor of the first sensor group exceeding a first threshold; activate a second sensor of the second sensor group in response to the first input corresponding to an unauthorized movement; and activate a tracking mode of the tracker apparatus, in response to a second input from the second sensor corresponding to an unauthorized movement.

15 Claims, 4 Drawing Sheets

(56) References Cited

U.S. PATENT DOCUMENTS

| | | | |
|---|---|---|---|
| 7,801,506 B2 | 9/2010 | Haave et al. | |
| 8,130,096 B2 * | 3/2012 | Monte | G08B 21/0277 340/426.1 |
| 8,144,008 B2 * | 3/2012 | Furey | G08B 1/08 340/286.01 |
| 9,109,943 B2 | 8/2015 | Mager et al. | |
| 9,253,752 B2 | 2/2016 | Lee et al. | |
| 9,355,381 B2 * | 5/2016 | Chakraborty | G06Q 10/087 |
| 9,613,239 B2 | 4/2017 | Lee et al. | |
| 10,288,446 B2 * | 5/2019 | Theytaz | G01C 22/006 |
| 2005/0188583 A1 * | 9/2005 | Jackson | F41A 17/06 42/70.11 |
| 2006/0276161 A1 * | 12/2006 | Twitchell | H04W 52/0229 455/343.1 |
| 2007/0021100 A1 * | 1/2007 | Haave | B60R 25/33 455/404.2 |
| 2007/0247359 A1 * | 10/2007 | Ghazarian | G01S 19/34 342/357.74 |
| 2008/0246656 A1 * | 10/2008 | Ghazarian | G08B 21/0202 342/357.54 |
| 2009/0309732 A1 * | 12/2009 | Truscott | G08B 13/1436 340/572.1 |
| 2012/0274564 A1 * | 11/2012 | Cronjaeger | G06F 1/3259 345/166 |
| 2012/0309388 A1 * | 12/2012 | Moosavi | H04W 76/38 455/426.1 |
| 2014/0085055 A1 * | 3/2014 | Lee | G06Q 10/08 340/10.5 |
| 2015/0126214 A1 * | 5/2015 | Kuhl | G01S 19/48 455/456.1 |
| 2015/0277559 A1 * | 10/2015 | Vescovi | G06F 1/1643 345/173 |
| 2016/0058329 A1 * | 3/2016 | Srinivas | A61B 5/112 600/595 |
| 2016/0321897 A1 * | 11/2016 | Lee | H04W 4/029 |
| 2017/0112433 A1 * | 4/2017 | Pugh | G01J 1/42 |
| 2017/0322049 A1 * | 11/2017 | Wootton | F28F 1/32 |
| 2017/0352235 A1 * | 12/2017 | Lai | H01M 4/38 |
| 2018/0082034 A1 * | 3/2018 | Singh | G16H 40/63 |
| 2018/0088206 A1 * | 3/2018 | Meadow | G01S 5/10 |
| 2018/0194379 A1 * | 7/2018 | McGavock, Jr. | B61L 23/007 |
| 2018/0196972 A1 * | 7/2018 | Lu | G06K 19/0723 |
| 2018/0216989 A1 * | 8/2018 | Servin | G01G 21/22 |
| 2019/0037362 A1 * | 1/2019 | Nogueira-Nine | G01S 5/0027 |
| 2019/0222674 A1 * | 7/2019 | Shribman | H04L 67/06 |
| 2019/0290192 A1 * | 9/2019 | Pugh | A61B 5/1103 |

* cited by examiner

SYSTEM AND METHOD FOR TRACKING OF DEPLOYED UNITS

CROSS-REFERENCE TO RELATED APPLICATIONS

This application is a continuation of U.S. patent application Ser. No. 16/110,762 filed on Aug. 23, 2018, now allowed, which claims the benefit of U.S. Provisional Application No. 62/547,096 filed on Aug. 17, 2017. The contents of the above-referenced applications are hereby incorporated by reference.

TECHNICAL FIELD

The present disclosure relates generally to tracking deployable units, and more particularly to theft detection of deployable units using tracking.

BACKGROUND

Asset monitoring is a field in Internet of Things (IoT) technology which aims to improve inventory monitoring, ascertain the status of goods through deployment, and attempt to reuse various items such as shipping pallets, crates, promotional stands, and the like. Some existing solutions for tracking lack real time capabilities. Furthermore, existing solutions may require an operator to manually download data from the tracking device. Other solutions either have a short battery life or require solar energy for operation. Many of the existing solutions require a cloud-based processing system to ascertain insights from the data received from the tracker.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a tracker apparatus for tracking deployable units, The tracker apparatus comprises: a first sensor group having a first power consumption profile; a second sensor group having a second power consumption profile; a communication circuit having a first network interface for communicating with a control server; an energy storage; a processing circuitry; and a memory, wherein the memory includes instructions that, when executed by the processing circuitry, configure the tracker apparatus to: trigger the processing circuitry to awaken from a low power mode in response to a first input from a first sensor of the first sensor group exceeding a first threshold; activate a second sensor of the second sensor group in response to the first input corresponding to an unauthorized movement; and activate a tracking mode of the tracker apparatus, in response to a second input from the second sensor corresponding to an unauthorized movement.

Some embodiments disclosed herein also include a method for tracking deployable units using a tracker apparatus. The method comprises: triggering the tracker apparatus to awaken from a low power mode in response to a first input from a first sensor exceeding a first threshold; activating a second sensor in response to the first input corresponding to an unauthorized movement; and activating a tracking mode of the tracker apparatus, in response to a second input from the second sensor corresponding to an unauthorized movement.

Some embodiments disclosed herein also include a non-transitory computer readable medium having stored thereon causing a processing circuitry to execute a process, the process comprising: triggering the tracker apparatus to awaken from a low power mode, in response to a first input from a first sensor exceeding a first threshold; activating a second sensor in response to the first input corresponding to an unauthorized movement; and activating a tracking mode of the tracker apparatus in response to a second input from the second sensor corresponding to an unauthorized movement.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
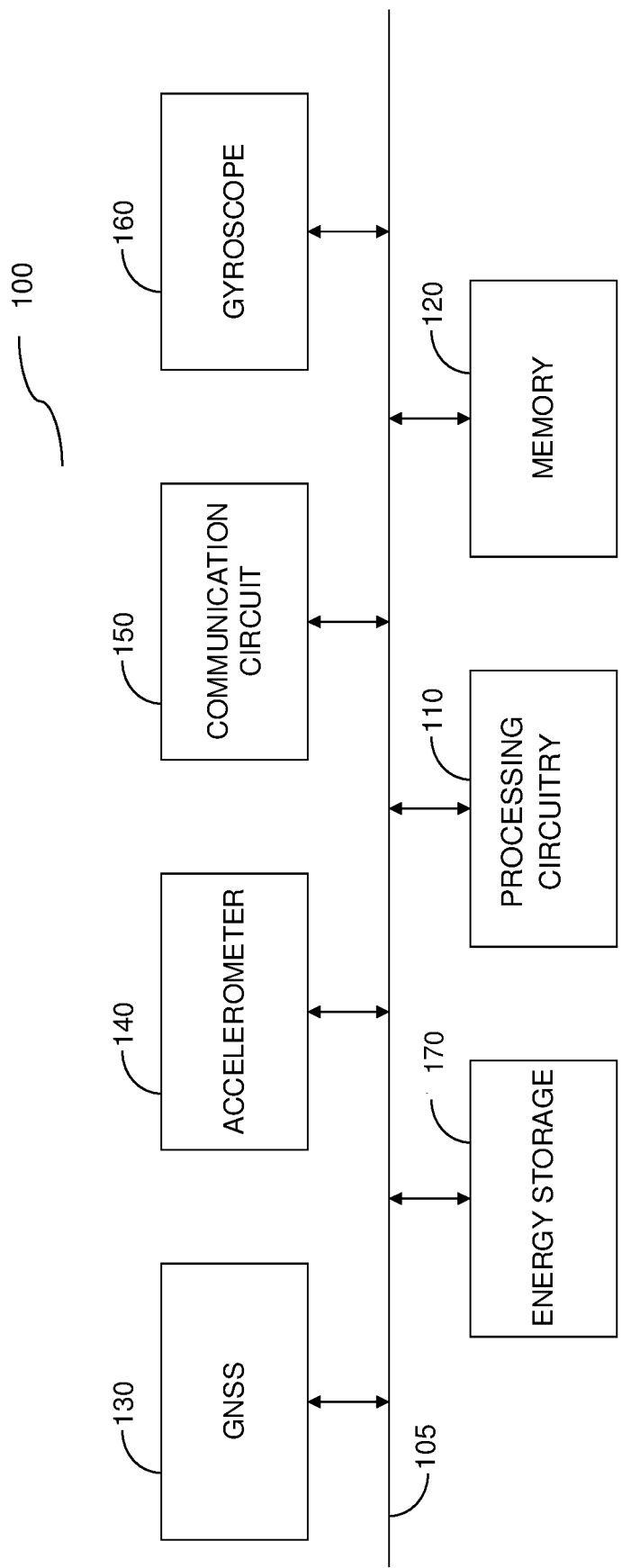
FIG. 1 is a schematic diagram of a sensor tracker for tracking deployable units according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to various disclosed embodiments, a tracker for tracking deployable assets includes a processor, memory, and a plurality of sensors. In an example configuration, the processor is configured to wake from a low power sleep mode in response to input from a first sensor exceeding a threshold, which may indicate an unauthorized movement of the device. The processor may then power off a first sensor and power on a second sensor, the second sensor having a higher energy cost than the first sensor, to sample an input therefrom. The sampled input may be stored in a memory and processed to determine if the movement is unauthorized. If the movement is unauthorized, the tracker may switch to a tracking mode, which has a power consumption profile higher than the low power sleep mode. This allows for conserving power, thereby allowing a deployable unit to function autonomously for longer periods of time.

FIG. 1 is an example schematic diagram of a sensor tracker 100 for tracking deployable units according to an embodiment. The sensor tracker (or simply a "tracker") 100 is operative for being attached, or otherwise placed in or on, to a deployable unit. A deployable unit may be, for example, an apparatus which someone may wish to track. For example, a deployable unit may be a promotional stand such as those placed in stores by manufacturers or distributors to promote a certain product. As another example, a deployable unit may be a container storing goods therein.

In an embodiment, the tracker 100 includes at least one processing circuitry 110. In an embodiment, the processing circuitry 110 may be, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 110 is coupled via a bus 105 to a memory 120. The memory 120 may include a memory portion (not shown) containing instructions that, when executed by the processing circuitry 110, configures the processing circuitry 110 to perform the processes and methods described in more detail herein. The memory 120 may be further used as a working scratch pad for the processing circuitry 110, as a temporary storage, and others, as the case may be. The memory 120 may be a volatile memory such as, but not limited to, a random access memory (RAM) or a non-volatile memory (NVM) such as, but not limited to, Flash memory. In certain embodiments, more than one memory type may be implemented, and a single memory is shown here merely for simplicity.

The memory 120 may further include another memory portion (not shown) containing sensor input data as explained in more detail with respect to FIG. 3 below. The processing circuitry 110 may be coupled to one or more sensors such as a global navigation satellite system receiver (GNSS) 130, an accelerometer 140, a communication circuit 150, a gyroscope 160, and an energy storage 170.

The energy storage 170 may be, for example, a battery such as a button cell. The GNSS 130 may include a global positioning system (GPS), a Global Navigation Satellite System (GLONASS), a Galileo receiver, a combination thereof, and the like. In some embodiments, a plurality of accelerometers 140 may be used. In certain embodiments, a plurality of accelerometers 140 are spatially configured so that the movement can be detected in two or three dimensions.

The communication circuit 150 may include one or more network interfaces, of short range, long range, medium range, or a combination thereof. Such network interfaces may include, but are not limited to, Wi-Fi, Bluetooth, LTE, and the like. In some embodiments, where a plurality of trackers 100 are deployed in a vicinity allowing such communication, a first tracker may be designated as a primary tracker, having for example an LTE transceiver for communicating over a cellular network, and a secondary interface, such as Wi-Fi, may be utilized for communicating between the primary tracker with one or more secondary trackers implemented within communication distance from the primary tracker. This is discussed in more detail with respect to FIG. 2 below.

The gyroscope 160 may be used to detect movement of the deployable unit to which the tracker 100 is attached. The gyroscope 160 may be, for example, a microelectromechanical system (MEMS). In some embodiments, the tracker 100 may also include a photodetector, pressure sensor, barometer, compass, temperature sensor, humidity sensor, or combination thereof. The sensors described herein may be implemented in any number of configurations without departing from the scope of the disclosed embodiments.

In some embodiments, each of the sensors may be each associated or configured with a power profile. The various power profiles are saved in the memory 120. The tracker 100 is configured with a plurality of power profiles and each power profile may be associated with a different operating mode of the tracker 100. For example, a first power profile includes a first group of one or more sensors, having in total a first power consumption (i.e. amount of power required to power the sensors, and, if applicable, processing unit). A second power profile may include one or more sensors from the first group, one or more sensors from another group, or a combination thereof, and have a second power consumption profile, which is different (larger or smaller) than the first power consumption profile.

According to the disclosed embodiments, the processing circuitry 110 configures the tracker 100 to utilize a first power profile which is lower in energy consumption than a second power profile. For example, the first power profile may include activating (i.e. supplying power to) one or more accelerometers. The second power profile may include activating the one or more accelerometers 140, the GNSS 130, and the communication circuit 150. In other embodiments, the processing circuitry 110 may configure the tracker 100 to activate each component on an as-needed basis in order to consume less power.

It should be noted that the processing circuitry 110 may configure the tracker 100 to switch to the second power profile upon detection that an input from the accelerometer exceeds a first threshold, for example. By powering on sensors on an as-needed basis, power may be conserved and a longer overall effective lifespan may be achieved for the tracker 100. The processing circuitry 110, the memory 120, or both, may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 2:
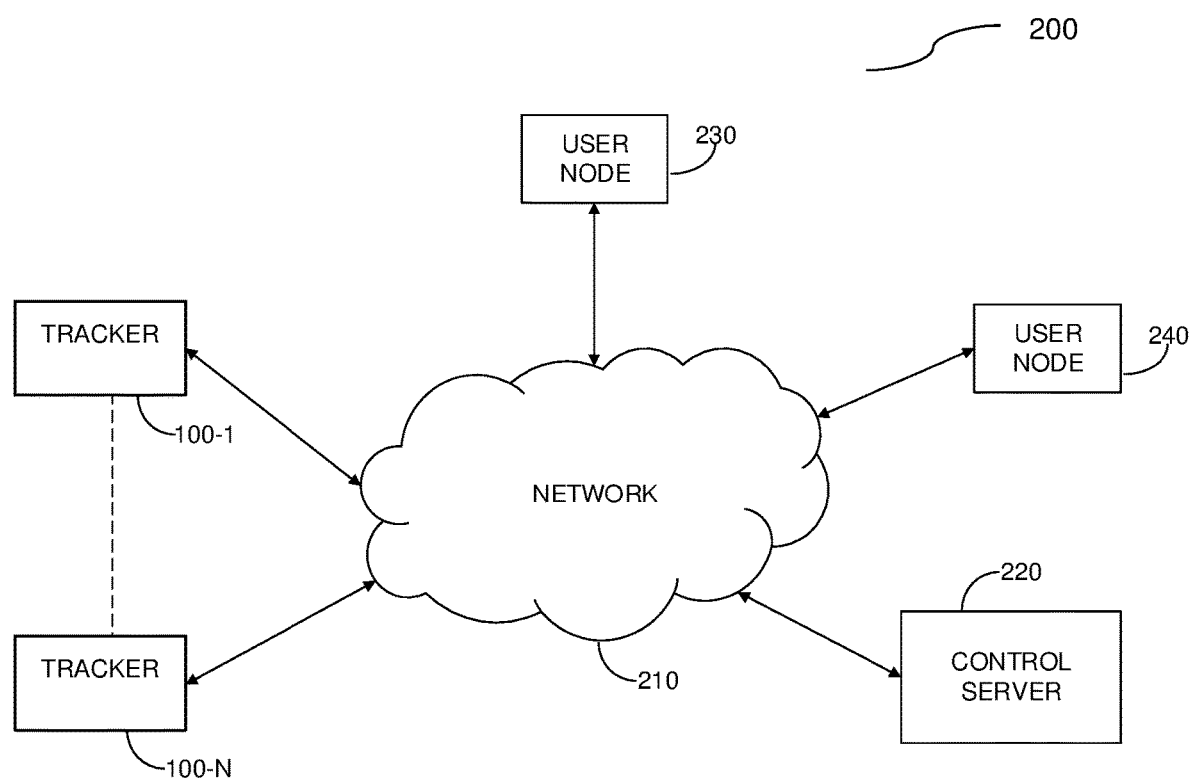
FIG. 2 is a network diagram illustrating a plurality of trackers communicating over a network with a control server utilized to describe various disclosed embodiments.

FIG. 2 is a network diagram illustrating a plurality of trackers communicating over a network with a control server utilized to describe various disclosed embodiments. As illustrated in FIG. 2, a network 210 provides communication between a plurality of trackers 100-1 through 100-N with a control server 220. In an embodiment, the network 210 may be configured to provide connectivity of various sorts, including but not limited to, wired, wireless connectivity, cellular connectivity, or a combination thereof. The wireless connectivity may include, for example, local area network (LAN), wide area network (WAN), metro area network (MAN), worldwide web (WWW), Internet, and any combination thereof.

The control server 220 may be configured to receive, from each of the plurality of trackers 100-1 through 100-N (hereinafter referred to as trackers 100), information such as alerts and status updates, and to send instructions to the trackers 100. The control server 220 may also communicate with user nodes, such as a first user node 230 and a second user node 240.

In a typical configuration, a user node includes an I/O interface (such as a touchscreen, display, keyboard, etc.) and may be a computer terminal, mobile phone, tablet, and the like. A user account (including, for example, an email address or username) may be associated with the user node 230 or 240 in a static or dynamic way. Communication between, for example, the control server 220 and the user node 230 or 240 may be based on identification through the associated user account. In an embodiment, a plurality of first user nodes 230 may be allocated to a first client and communicatively connected to a first plurality of tracker 100-1 through 100-X (where 'X' is an integer number less than 'N'). In this example, a second plurality of trackers 100-Y through 100-Z (where 'Y' is greater than 'X', and 'Z' is greater than 'Y' and less than or equal to 'N') may be allocated to a second client, and communicatively connected with a second plurality of user nodes 240. That is, each client can communicate with a subset of the trackers 100.

It should be noted that a client in this example is a group of users (user accounts) or user nodes. The control server 220 may be configured to associate a tracker unit 100 with a client (or corresponding user node of the client). For example, when the control server 220 receives an alert from a tracker 100 associated with a first user node 230, the control server 220 may be configured to determine if the alert should be sent to the first user node (or corresponding user account) 230.

In another example, a first control server 220 may be implemented for a first group of user nodes associated with a first client, and a second control server (not shown) may be implemented for one or more additional group(s) of user nodes. In certain embodiments, a first tracker (e.g., a tracker 100-1) may include a first communication interface for communicating with a network such as the network 210, and a second communication interface, for communicating with one or more secondary trackers which are not equipped to communicate directly with the network. In this embodiment, 'N', 'X', 'Y', and 'Z' are natural integer numbers.

Figure 3:
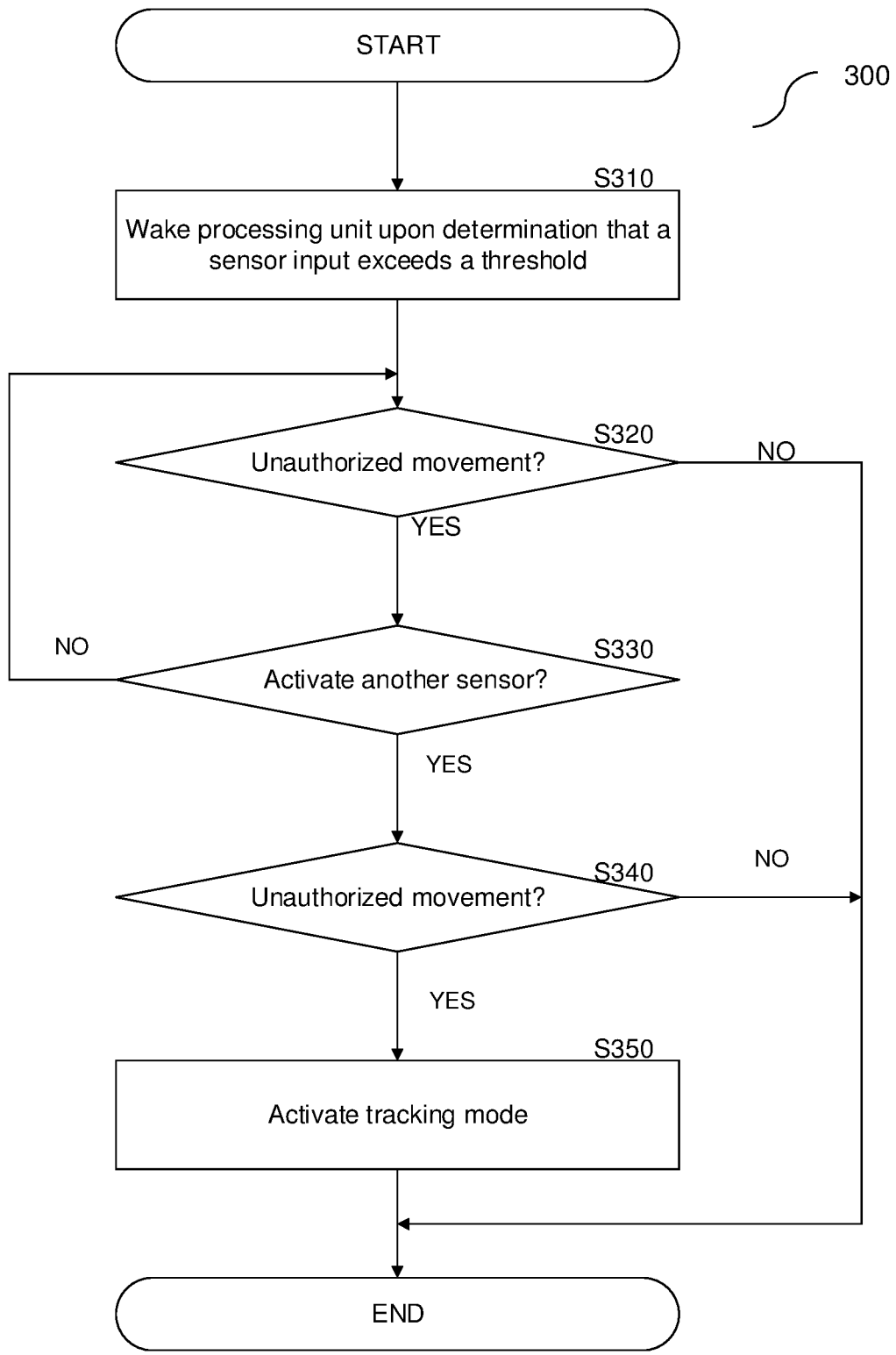
FIG. 3 is a flowchart of a method for tracking deployable assets using a tracker according to an embodiment.

FIG. 3 is an example flowchart 300 of a method for tracking deployable units using a tracker implemented in accordance with an embodiment. The operation of the method will be discussed with reference to the tracker 100 illustrated in FIG. 1.

At S310, the tracker is activated, upon a sensor input from a first sensor exceeding a first threshold. For example, if an accelerometer detects acceleration exceeding a certain threshold, the tracker may be configured to power on elements of the tracker and, in particular, the processing circuitry (also known as waking from sleep mode, or in some embodiments, hibernate mode). Typically, the first sensor is powered on when the processor is in a hibernate state (low power state), and the processor may shut down the sensor to conserve power upon powering on. The first sensor preferably has a low power consumption profile relative to at least another element of the tracker, which leads to a longer operational life of the tracker unit than if all elements would have been powered on simultaneously. A group of first sensors may be utilized in some embodiments, which may include sensors of the same type or sensors of different types.

In an embodiment, sensor inputs, in a non-transitory form, may be stored in a memory accessible to the processing unit, such as memory 120. In some embodiments, the circuitry 110 may store (known in the industry also as "dump") the contents of an internal memory, such as processor cache or other RAM memory, into a flash memory when entering a hibernate state. The data is then loaded back in the processor internal memory when the processor is awoken from the hibernate mode.

At S320, a determination is made if the sensor input corresponds with an authorized movement. If so, execution continues with S330; otherwise, execution ends and the tracker may turn back to idle state (also called sleep) mode.

In some embodiments, the tracker may have stored therein sensor inputs which correspond to movements which are preauthorized. For example, if the tracker is deployed on a promotional stand in a store, it is reasonable for an employee to move the stand from one part of the store to another. This would be configured as an authorized movement. However, if the stand is moved from the store into a car, and is driven from the premises, this may be an unauthorized movement. In this example, the accelerometer may detect movement above a speed, or for a period of time which when computed with movement could indicate moving a distance outside of an authorized geographical zone.

As another example, Wi-Fi (and cellular) triangulation may be used to determine location, before or in tandem with using GPS location. In some embodiments, unauthorized movement may also be such that causes damage to the device. For example, a tracker is fixed on a fragile asset (deployable unit), and may detect that while in transit, road conditions are especially bumpy (easily detected by an accelerometer) which may cause the asset to fracture.

The tracker may be preprogrammed to continuously determine a probability of damage to the asset, for example by performing a linear regression or implementing a machine learning model to determine the likelihood of damage occurring based on received inputs from the sensor.

At S330, it is determined if one or more additional sensors should be activated. Such sensors may be, for example, an accelerometer, a compass, a gyroscope, a GNSS receiver, and the like. In some embodiments, it is determined, by the tracker, that the first sensor and another sensor should both be activated. In other embodiments, the tracker may be configured to activate the additional sensor(s), and deactivate the first sensor, in order to preserve power. In certain embodiments, the tracker may determine to activate another component, which is not necessarily another sensor. For example, the tracker may be configured to activate the communication circuit and send therethrough an alert to a control server, such as control server 220. If another sensor is activated, execution continues at S340, otherwise execution continues at S320.

At S340, after activating the additional sensor, it is determined, based on the input of the additional sensor, if the input corresponds to an unauthorized movement. In some embodiments, it is determined if the input corresponds to a movement which is not authorized, which is distinct from detecting an unauthorized movement. Detecting an unauthorized movement is positively detecting a type of movement which is not allowed. Detecting a movement which is not authorized means, in the context of this disclosure, detecting a movement which is distinct from a preauthorized list of authorized movements. When it is determined that an unauthorized movement is detected from the input, execution continues at S350; otherwise, execution terminates (shown), or in some embodiments, continues at S320 (not shown).

At S350, a tracking mode of operation is activated. In tracking mode, the tracker activates various sensors, statically or dynamically. For example, once in tracking mode, the tracker may be configured to periodically send GPS coordinates to a control server through the communication circuit, having for example and LTE interface.

In another example, the tracker may switch sensors on, receive inputs therefrom, switch sensors off, store the inputs on a memory, and send to the control server when the communication circuit is switched on. By switching on a component only when it is in use, the tracker may be able to conserve power and thus achieve operational capability for a longer time than if all components were always on.

In certain embodiments, the tracker may further optimize the total power consumption profile, based on the available energy storage level. For example, if the battery is depleted below a first voltage level, the tracker may configure the GNSS receiver to sample less frequently, than when the battery level is above the first voltage level. In some embodiments, the tracker may have a predefined critical battery level, below which the tracker registers input from one or more sensors (either in parallel or serially) and stores them in a memory, rather than transmit.

In yet another example, the tracker may be configured to send an alert directly to a user device of an authorized user. For example, the tracker may be configured to send a first alert type to a user, and a second alert type (for example, on which is less critical, or requires further analysis) to a control server.

In an example embodiment, the processing circuitry may be triggered to a power mode by processing input from an accelerometer and a gyroscope to determine if a movement is unauthorized. In the above example, a threshold of 50 meters may be predefined such that movement beyond this range is unauthorized. Upon determining that the movement which triggered the tracker awakening is unauthorized, the tracker is configured to shut down the accelerometer and gyroscope, and to activate a GPS receiver to determine latitude and longitude coordinates. These values may be compared with values previously stored by the tracker in a memory, for example, when the tracker is deployed.

When the difference between the stored coordinates and the sampled coordinates exceed a threshold (which may be predefined, dynamic, or adaptive), the tracker may be configured to power off the GPS receiver, power on the communication interface, and send, via the latter, an alert. The alert may be sent to a control server, user node, and the like. The alert may be a text message, a push notification, logged in a database, and so on. The tracker may then switch power modes to tracking (going from hibernate, to awake, to tracking). In the tracking power mode, the tracker is configured to operate the processing circuitry to be in a sleep mode and to wake up at certain intervals to power on the GPS receiver and compare the sampled coordinates to stored coordinates (a plurality of coordinate pairs may be stored).

The tracker may be configured to send the control server an alert on any movement in GPS coordinates, to periodically send GPS coordinates, or both, even if they have not changed. In this way, a user may have indication that the tracker device is still functional.

It should be appreciated that by utilizing different power profiles and different sensors, a higher conservation of energy may be achieved, resulting in longer product life. Further, by delegating at least a portion of the detecting unauthorized movements to the tracker rather than the control server, bandwidth between the control server (220, FIG. 2) and the tracker is conserved, potentially leading to both lowered communication costs and conserving power by not operating the communication circuit unless required. Delegating at least a portion of the detecting unauthorized movement may also affect the amount of computation power required by the control server.

It should be further appreciated that, as a portion of the computation is being performed by the tracker units, less computation is being performed by the control server, which may result in reduced costs. In some embodiments, a control server may receive input from a sensor of a tracker and use the input to train a machine learning system, such as a neural network.

A plurality of such inputs, received from one or more sensors, may be used to train the neural network to detect authorized or unauthorized events, predict damage to an asset, and so on. A trained neural network may then be sent to one or more tracker units, to allow improved processing of events based on sensor input.

Figure 4:
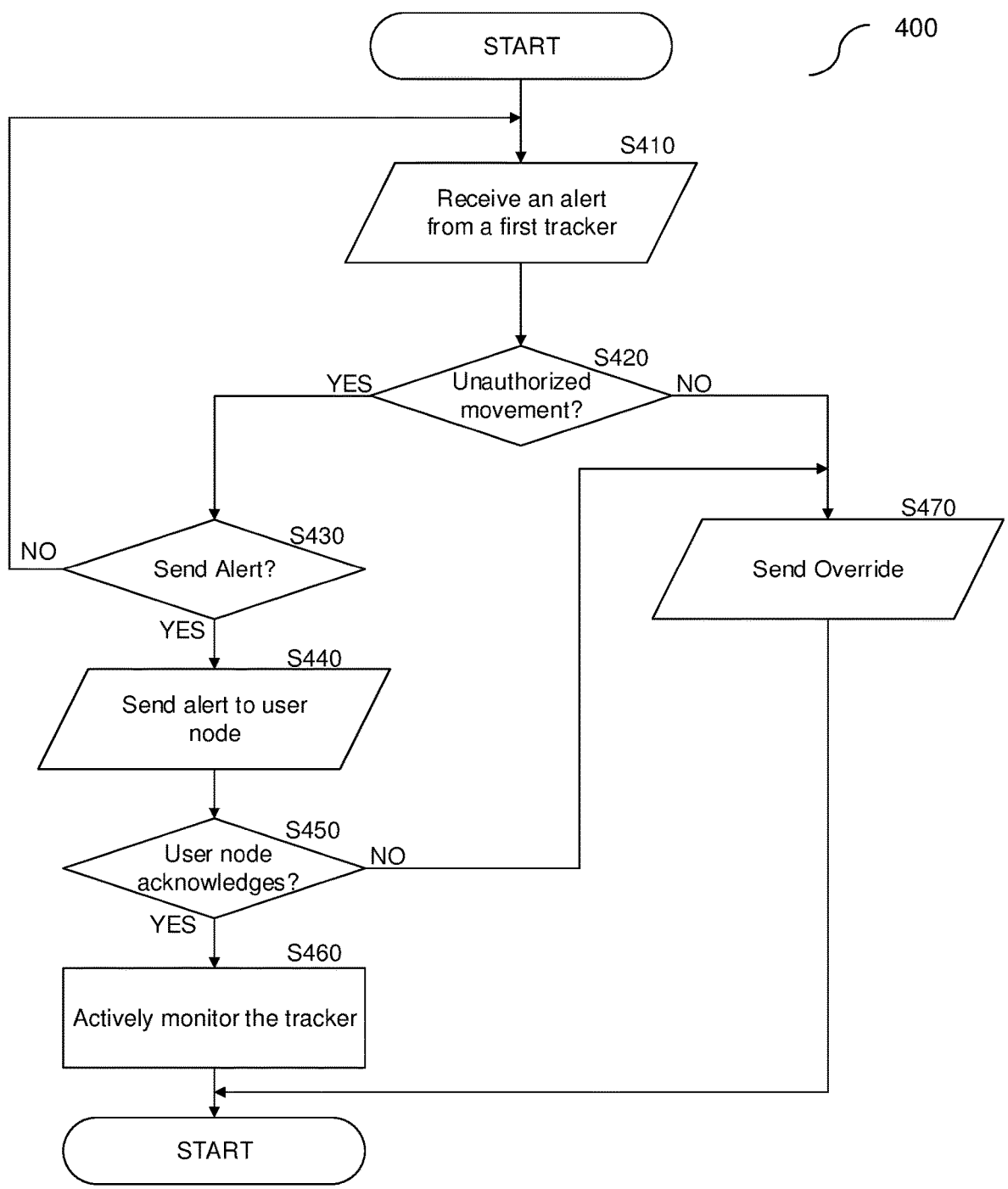
FIG. 4 is a flowchart of a method for operating a control server according to an embodiment.

FIG. 4 is an example flowchart 400 of a computerized method illustrating operation of a control server according to an embodiment.

At S410, an alert from a tracker is received. The alert may be received from example over a network 210. The alert may include any one or more of raw (i.e. unprocessed) sensor input from one or more sensors, processed sensor input from one or more sensors, an alert type, an alert level, and the like.

At S420, it is determined if the alert corresponds to an unauthorized movement. If the movement is determined not to be unauthorized (or to be an authorized movement), execution continues at S470. At S470, an override instruction is sent to the tracker, to return the tracker from tracking mode to idle state. If the movement is determined to be unauthorized (or not an authorized movement) execution continues at S430.

At S430, it is determined if a user node, a user account, or both, should be sent an alert based on the received alert. If 'no', execution continues at S410, to continue monitoring the tracker. This may be useful, for example, for received alerts which are labeled as non-critical. If it is determined that an alert should be sent, execution continues at S440.

At S440, an alert is sent to the user node (or user account), based on the alert received by the control server. In some embodiments, a confidence level regarding the alert is also provided, for example by performing additional processing on a received sensor input, if such is provided.

At S450, it is determined if the user node has acknowledged whether the movement is indeed unauthorized. For example, if a tracker is transported by the owner, that movement is typically authorized even though it may register as an unauthorized movement (if it were performed by anyone else). If, for example, the user node sends (to the control server 220) an indication that the movement is authorized, execution continues at S470, otherwise execution continues at S460.

At S460, the tracker is actively monitored. Active monitoring may include periodically checking to see if an alert was received from the tracker, and if such an alert or other message is not received, to notify a user account.

In an embodiment, the control server may render on a display (or provide for rendering on a display of the user node) a map with the most recent location of the tracker. The render may further include all points from which the control server received GNSS coordinates from the tracker. In some embodiments, the location may further include a confidence level, by rendering a circle on the displayed map within which the tracker is likely present in.

In some embodiments, the control server may determine a location of one or more authorized users, for example by receiving location coordinates from user devices of the same authorized users. The server may then compare the location of the authorized user to the location of the tracker, to further determine if the user and the tracker are in proximity. This would allow determining if the unauthorized movement is made by an authorized user, in which case the alert level may be lowered, for example. Further, by determining the closest authorized user to the tracker device, the user may be deployed to the location of the tracker device in order to determine on premise the status of the tracked asset. This in turn cuts down the response time and may aid in preventing theft, if such occurs.

It should be noted that control server may include the processing circuitry coupled to a memory (not shown). The processing circuitry may be, or be a component of, a larger processing unit implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The memory of the server may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A tracker apparatus for tracking deployable units, comprising:
    a first sensor group having a first power consumption profile;
    a second sensor group having a second power consumption profile, wherein each of the first power consumption profile and the second power consumption profile has a respective total power consumption, wherein each of the first power consumption profile and the second power consumption profile is associated with a respective operating mode of the tracking apparatus;
    a communication circuit having a first network interface for communicating with a control server;
    an energy storage;
    a processing circuitry; and
    a memory, wherein the memory includes instructions that, when executed by the processing circuitry, configure the tracker apparatus to:
    trigger the processing circuitry to awaken from a low power mode in response to a first input from a first sensor of the first sensor group exceeding a first threshold;
    activate a second sensor of the second sensor group in response to the first input corresponding to an unauthorized movement;
    activate a tracking mode of the tracker apparatus, in response to a second input from the second sensor corresponding to an unauthorized movement;
    send an alert to the control server in response to a detection of unauthorized movement; and
    return to the low power mode in response to receiving, from the control server, an instruction, from a user node, indicating that the unauthorized movement is authorized.

2. The tracker apparatus of claim 1, wherein the first sensor group includes an accelerometer.

3. The tracker apparatus of claim 1, wherein the second sensor group includes at least one of: a global navigation satellite system (GNSS) receiver, a gyroscope, a compass, an accelerometer, thermal sensor, and a humidity sensor.

4. The tracker apparatus of claim 1, wherein the first network interface is any one of: Wi-Fi, Bluetooth, or Long Term Evolution (LTE).

5. The tracker apparatus of claim 1, wherein the first power consumption profile is lower than the second power consumption profile.

6. The tracker apparatus of claim 1, wherein the tracker apparatus is further configured to:
store the first input in the memory.

7. The tracker apparatus of claim 6, wherein the tracker apparatus is further configured to:
store the second input in the memory.

8. The tracker apparatus of claim 1, wherein the tracker apparatus is further configured to:
deactivate the first sensor group in response to activating the second sensor; and
deactivate the second sensor group in response to activating another component of the tracker apparatus.

9. The tracker apparatus of claim 1, wherein the tracker apparatus includes a global navigation satellite system (GNSS), wherein the tracker apparatus is further configured to:
determine coordinates of an authorized user of the tracker apparatus;
determine coordinates of the tracker apparatus using the GNSS; and
send an alert to a device of the authorized user when a difference between the coordinates of the authorized user and the coordinates of the tracker apparatus exceeds a first threshold.

10. A method for tracking deployable units using a tracker apparatus, comprising:
configuring the tracker apparatus to awaken from a low power mode, in response to a first input exceeding a first threshold, wherein the first input is from a first sensor;
configuring a second sensor to activate in response to the first input corresponding to an unauthorized movement;
configuring the tracker apparatus to activate a tracking mode in response to a second input from the second sensor corresponding to an unauthorized movements;
configuring the first sensor to deactivate in response to activating the second sensor; and
configuring the second sensor to deactivate in response to activating another component of the tracker apparatus.

11. The method of claim 10, the first sensor having a first power consumption profile, the second sensor having a second power consumption profile, wherein the first power consumption profile is lower than the second power consumption profile.

12. The method of claim 10, further comprising:
configuring the tracking apparatus to return to the low power mode when the unauthorized movement has been authorized.

13. The method of claim 10, further comprising:
determining coordinates of an authorized user of the tracker apparatus;
determining coordinates of the tracker apparatus, wherein the tracker apparatus includes a global navigation satellite system (GNSS); and
sending an alert to a device of the authorized user when a difference between the coordinates of the authorized user and the coordinates of the tracker apparatus exceeds a first threshold.

14. The method of claim 10, further comprising:
receiving coordinates of the tracker apparatus from the tracker apparatus, wherein the tracker apparatus includes a global navigation satellite system (GNSS);
receiving coordinates of an authorized user; and
sending an alert to a device of the authorized user when a difference between the coordinates of the authorized user and the coordinates of the tracker apparatus exceeds a first threshold.

15. A non-transitory computer readable medium having stored thereon instructions for causing a processing circuitry to execute a process, the process comprising:
triggering a tracker apparatus to awaken from a low power mode, in response to a first input exceeding a first threshold, wherein the first input is from a first sensor;
activating a second sensor in response to the first input corresponding to an unauthorized movement;
activating a tracking mode of the tracker apparatus in response to a second input from the second sensor corresponding to an unauthorized movements;
sending an alert to a control server in response to a detection of unauthorized movement; and
returning the tracker apparatus to the low power mode in response to receiving, from the control server, an instruction, from a user node, indicating that the unauthorized movement is authorized.

* * * * *